United States Patent [19]

Johnson et al.

[11] Patent Number: 4,903,270

[45] Date of Patent: Feb. 20, 1990

[54] APPARATUS FOR SELF CHECKING OF FUNCTIONAL REDUNDANCY CHECK (FRC) LOGIC

[75] Inventors: David B. Johnson; Mark S. Myers, both of Portland; Eileen Riggs, Hillsboro, all of Oreg.

[73] Assignee: Intel Corporation, Santa Clara, Calif.

[21] Appl. No.: 206,418

[22] Filed: Jun. 14, 1988

[51] Int. Cl.$^4$ .............................................. G06F 11/16
[52] U.S. Cl. ........................................ 371/68.1; 371/3
[58] Field of Search .................. 371/3, 68, 9, 25, 8, 371/8.1, 9.1, 25.1, 68.1, 68.3; 364/187

[56] References Cited

U.S. PATENT DOCUMENTS

| | | | |
|---|---|---|---|
| 3,257,546 | 6/1966 | McGovern | 371/3 |
| 3,680,069 | 7/1972 | Neumann | 371/3 X |
| 4,012,717 | 3/1977 | Censier | 364/200 |
| 4,792,955 | 12/1988 | Johnson | 371/68 |

FOREIGN PATENT DOCUMENTS 109944 6/1983 Japan ...................................... 371/3

OTHER PUBLICATIONS

IBM TDB, "Error-Handling Testing Via Error Injection", vol. 29, No. 2, 7/1986, pp 542-543.
J. M. Baron, "Checking of Check Circuitry", IBM TDB, vol. 11, No. 11, 4/1969, pp 1398-1399.
IBM TDB, "Verification of Error Correction Circuitry", vol. 31, No. 1, 6/1988, pp 127-128.
D. East, "Error Injector for Testing a Data Processing Unit", IBM TDB, vol. 17, No. 6, 11/1974.

Primary Examiner—Jerry Smith
Assistant Examiner—Robert W. Beausoliel
Attorney, Agent, or Firm—Owen L. Lamb

[57] ABSTRACT

An integrated circuit module (200) in which an error detection circuit (234, 263) compares data (204) generated internally on module (200) with data (108) generated externally from another substantially identical module (100). An error detect output (238) is asserted upon the condition that data (204) generated internally on module (200) and data (108) generated externally from module (100) do not match. A circuit (222, 224) alters the internally generated data (204) by injecting erroneous data into the internally generated data (204) to thereby generate altered data (230). Error anticipation control logic (210) generates a test condition (214, 216), which corresponds to the expected error condition caused by altered data. Comparison circuit (242) compares the actual error detect output (238, 240) with expected error detect output (214, 215). An error output (244) is asserted if the actual error detect output (238, 240) and the expected error detect output (214, 216) do not match.

4 Claims, 2 Drawing Sheets

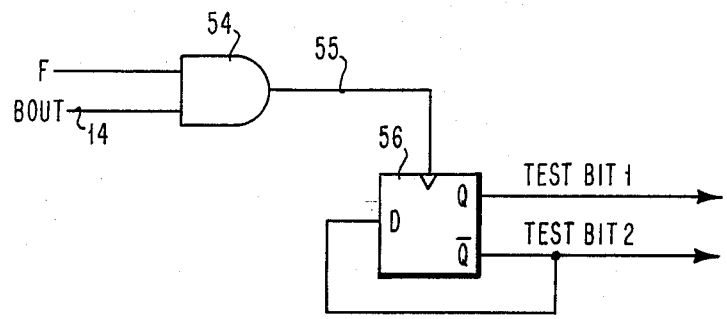
FIG.2
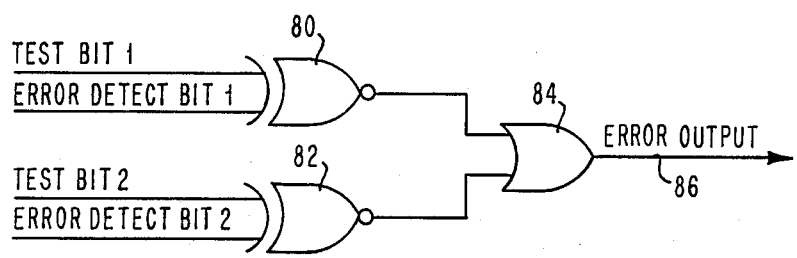
FIG.3
| TEST BIT 1 | TEST BIT 2 | ERROR DETECT BIT 1 | ERROR DETECT BIT 2 | ERROR OUTPUT |
|---|---|---|---|---|
| 1 | 0 | 0 | 0 | ERROR |
| 1 | 0 | 0 | 1 | ERROR |
| 1 | 0 | 1 | 0 | OK |
| 1 | 0 | 1 | 1 | ERROR |
| 0 | 1 | 0 | 0 | ERROR |
| 0 | 1 | 0 | 1 | OK |
| 0 | 1 | 1 | 0 | ERROR |
| 0 | 1 | 1 | 1 | ERROR |
FIG.4

APPARATUS FOR SELF CHECKING OF FUNCTIONAL REDUNDANCY CHECK (FRC) LOGIC

BACKGROUND OF THE INVENTION

1. Field of the Invention

This invention relates to data processing systems, and more particularly, to means for continuously checking for failures in error checking logic.

2. Description of the Related Art

In U.S. Pat. No. 4,176,258 of Daniel Jackson, granted on Nov. 27, 1979 and assigned to Intel Corporation, detection of errors is accomplished by a redundancy method known as functional redundancy checking (FRC). In this method, an integrated circuit component is duplicated and output signals from the two identical components are compared in an FRC logic. An error condition is reported if the output signals do not match one another.

U.S. Pat. No. 4,792,955 "Apparatus For On-line Checking and Reconfiguration of Integrated Circuit Chips" by David B. Johnson, et al, granted on Dec. 20, 1988 and assigned to Intel Corporation describes a way of recovering from an error detected by the FRC logic where one of the components is found to be faulty. This is done by splitting the components apart so that the faulty one is disengaged from the system and the operative one continues in use, but without the FRC checking capability.

In these prior circuits, if the FRC logic itself is not working correctly error conditions may go unreported. Because the FRC logic is what the system relies on to correctly identify errors, it is important that the FRC logic itself by tested during normal operation of the system.

It is therefore an object of this invention to provide a redundant module checking system in which the error checking logic continuously performs a check on itself in order to ascertain that it is working correctly.

SUMMARY OF THE INVENTION

Briefly, the above object is accomplished in accordance with the invention by providing an integrated circuit module (200) in which an error detection circuit (234, 236) compares data (204) generated internally on the module (200) with data (108) generated externally from another substantially identical module (100). An error detect output (238, 240) is asserted upon the condition that data (204) generated internally on module (200) and data (108) generated externally from module (100) do not match. A circuit (222, 224) alters the internally generated data (204) by injecting erroneous data into the internally generated data (204) to thereby generate altered data (230, 232). An error anticipation control logic (210) generates a test condition (214, 216), which corresponds to the expected error condition caused by the altered data. A comparison circuit (242) compares the actual error detect output (238, 240) with the expected error detect output (214, 216). An error output (244) is asserted if the actual error detect output (238, 240) and the expected error detect output (214, 216) do not match.

The invention has the advantage that malfunctions in error detection circuitry can be detected during normal operation of the components.

BRIEF DESCRIPTION OF THE DRAWINGS

The foregoing and other objects, features, and advantages of the invention will be apparent from the following detailed description of a preferred embodiment of the invention as illustrated in the accompanying drawings wherein:

FIG. 2 is a diagram of the control logic block on each module of FIG. 1;

FIG. 3 is a diagram of the check logic block on each module of FIG. 1; and,

FIG. 4 is a truth table for the check logic of FIG. 3.

DESCRIPTION OF THE PREFERRED EMBODIMENT

Figure 1:
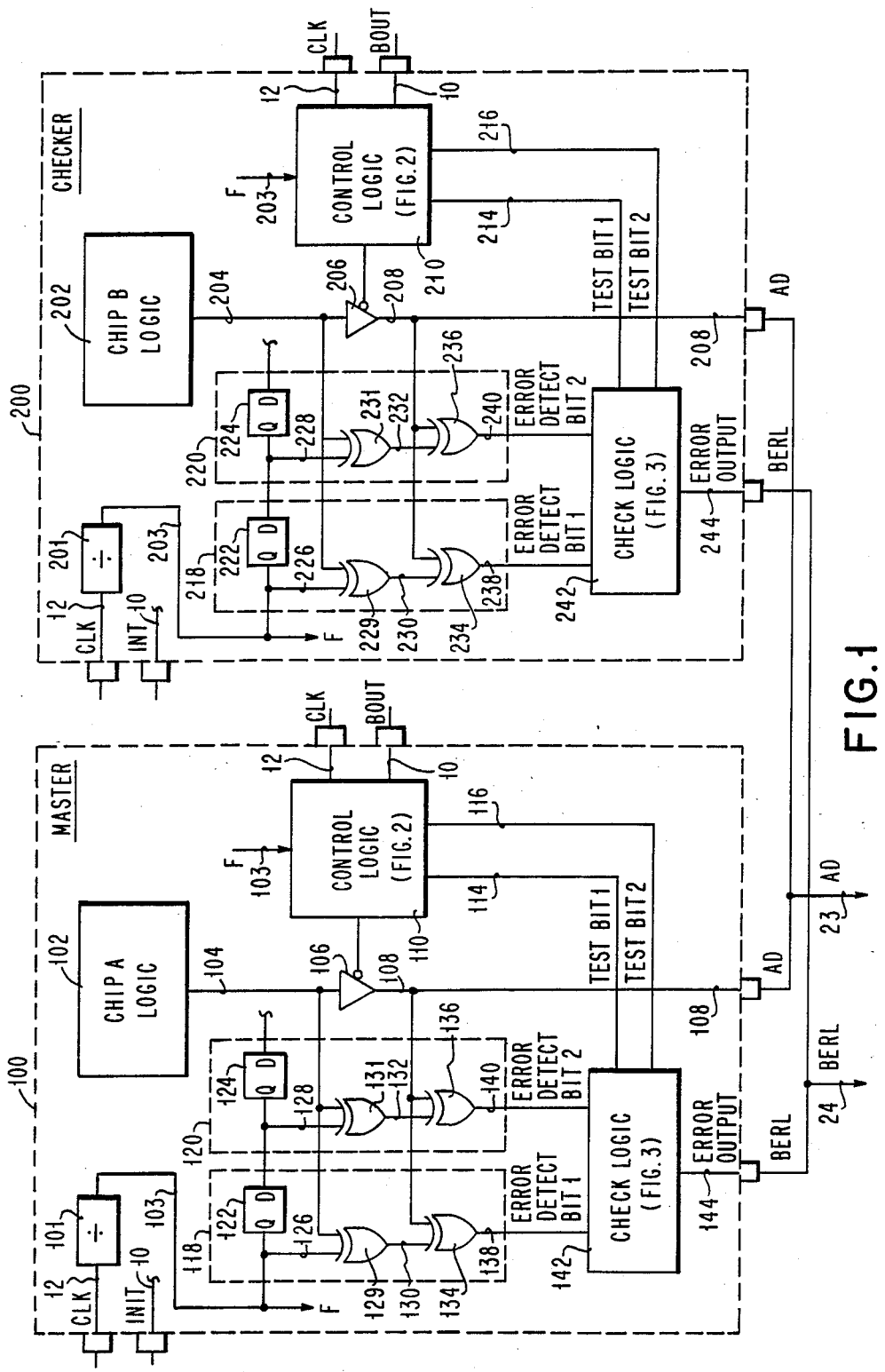
FIG. 1 is a diagram of two modules that are connected together for functional redundancy checking.

Referring to FIG. 1, the detection of errors at the Address/Data (AD) bus (23) is done by Functional Redundancy Checking (FRC) logic which is present on both identical modules (100, 200). The outputs of the modules (100, 200) are connected together, either by using tri-state drivers or they are wired OR. All of the self-checking logic and FRC checking logic is integrated on each module, so that only one part number need be manufactured. This means that each module can test itself independently of the other module. One of the pair of modules, for example module (100), assumes the role of master, while the other module (200) assumes the role of checker. Both modules form a single logical module that is said to be FRC'd. The two modules run in lock step and at every step the checker compares its outputted data with the corresponding data outputted by the master to ensure that it has computed the same results as the master. If a disagreement is detected, then an error is signalled on the Bus Error Reporting Line (BERL) output (244) of the checker module (200).

The logic within the dotted lines (118, 120; 218, 220) of FIG. 1 illustrates the duplicated self-checking logic and the FRC logic for one bit, for simplicity and ease of understanding. One signal line (104; 204) from the logic (102; 202) is connected to the duplicated logic tree (118, 120; 218, 220). This allows one logic tree to have an injected error and do a self-check while the other tree will not have an injected error and can perform the standard FRC check. It will be readily understood by those skilled in the art that the circuitry can be replicated to check more than one signal line from the chip logic. The following chip pins are used for the FRC functions:

Bus Error: BERL

The Bus Error Reporting Line (BERL) outputs are used to signal errors during the self-testing of the FRC logic and are connected to the output of the error logic of FIG. 3. The BERL outputs are also used to report chip logic errors to the user's system. This error reporting mechanism is not part of the present invention but is more fully described in the above-referenced Pat. No. 4,792,955 and the patents referenced therein.

System clock signal: CLK

The CLK signal (12) provides the basic timing for both modules (100, 200).

Initialization Signal: INIT

The INIT signal (10) forces all components (such as flip-flops) to reset and synchronize. A bus cycle begins at the first system clock (CLK) period after INIT is asserted. All components recognize this and will remain in synchronization thereafter.

Address/data lines: AD

The AD lines (108, 208) carry address and data information between the chip and the AD bus (23).

Bus Output Control: BOUT

When BOUT (14) is asserted the chip is activated so that it drives the AD bus (23).

Referring now to FIG. 1, the module (100) has Chip A logic (102) fabricated thereon. The output of the Chip A logic comprises several bits, one of which is illustrated by the single line (104). The output (104) is connected to exclusive NORs (129, 131) and to the input of a three-state driver (106). Only one three-state driver is shown, it being understood that there would be as many drivers as there are outputs from the chip logic. Each three-state driver has an enable input (112) which is connected to control logic (110). The outputs of the exclusive NORs (129, 131) and the drivers (106) are connected to exclusive NORs (134, 136). When the enable driver input (112) to three-state drivers (106) is energized, the three-state drivers (106) for each output of the chip A logic are disabled so that no data passes therethrough.

The outputs of a shift chain (122, 124) drive exclusive NORs (129, 131), the outputs (130, 132) of which drive the inputs of exclusive NORs (134, 136). The TEST BIT 1 output (114) and TEST BIT 2 output (116) provide a test pattern of one's and zeros corresponding to the expected error condition forced by the shift chain (122, 124).

The shift chain is driven by the output (103) of a frequency divider (101). The divider provides an appropriate recurring frequency (F) such as the CLK signal (12) divided by four. The shift chain (122, 124) shifts a bit from one stage of the shift chain to the next so that an error is successively injected into the FRC logic. A check can then be made by examining the ERROR DETECT outputs with the expected forced error condition as provided by a test circuit (FIG. 2) within the control logic (110). That is, the erroneous bit injected into the BIT 1 FRC logic should cause an error condition to be asserted on the ERROR DETECT BIT 1 line at the same time that the expected error condition is asserted on the TEST BIT 1 line.

The module (200) is identical to module (100) and its operation is the same as the description given above with respect to module (100).

The module (200) has Chip B logic (202) fabricated thereon. The output of the Chip B logic comprises several bits, one of which is illustrated by the single line (204). The output (204) is connected to exclusive NORs (229, 231) and to the input of a three-state driver (206). Only one three-state driver is shown, it being understood that there would be as many drivers as there are outputs from the chip logic. Each three-state driver has an enable input (212) which is connected to control logic (210). The outputs of the exclusive NORs (229, 231) and the drivers (206) are connected to exclusive NORs (234, 236). When the enable driver input (212) to three-state drivers (206) is energized, the three-state drivers (206) for each output of the chip B logic are disabled so that no data passes therethrough.

The outputs of a shift chain (222, 224) drive exclusive NORs (229, 231), the outputs (230, 232) of which drive the inputs of exclusive NORs (234, 236). The TEST BIT 1 output (214) and TEST BIT 2 output (216) provide a test pattern of one's and zeros corresponding to the expected error condition forced by the shift chain (222, 224).

The shift chain is driven by the output (203) of a frequency divider (201). The divider provides an appropriate recurring frequency (F) such as the CLK signal (12) divided by four. The shift chain (222, 224) shifts a bit from one stage of the shift chain to the next so that an error is successively injected into the FRC logic. A check can then be made by examining the ERROR DETECT outputs with the expected forced error condition as provided by a test circuit (FIG. 2) within the control logic (210). That is, the erroneous bit injected into the BIT 1 FRC logic should cause an error condition to be asserted on the ERROR DETECT BIT 1 line at the same time that the expected error condition is asserted on the TEST BIT 1 line.

The shift chain on each module affects the value of one bit at a time to force an error in that bit to test the FRC logic. Since this bit is internally corrupted an FRC error should be indicated on the corresponding FRC error detect line (ERROR DETECT BIT 1 or ERROR DETECT BIT 2) if the FRC logic is working correctly. The check logic shown in FIG. 3 implements the truth table shown in FIG. 4 to determine if an error condition exists. If everything is functioning normally at the time an error condition is forced, the ERROR OUTPUT line (86) will indicate OK. All other conditions indicate a failure in the FRC logic itself, or a disagreement between the outputs of the master module (100) and the checker module (200).

Referring now to FIG. 3, the TEST BIT 1 line and the ERROR DETECT BIT 1 line are combined in an exclusive NOR (80) which drives one leg of an OR (84). The TEST BIT 2 line and the ERROR DETECT BIT 2 line are combined in an exclusive NOR (82) which drives the other leg of the OR (84). If the anticipated error condition on the TEST BIT line matches the actual error condition on the ERROR DETECT line, the output of the OR will remain negative indicating that no error in the self-check has occurred. Any mismatch will result in the assertion of the error output (86).

The test detection operates as follows. Module (100) and module (200) are substantially identical modules having identical chip logic (102; 202) and are connected to a common address/data (AD) bus (23). The module (100) has been designated as a master and the module (200) has been designated as a checker. Accordingly, the driver (106) on master module (100) is enabled and driver (206) on checker module (200) is not enabled. This allows the comparators (234, 236) on checker module (200) to perform a self-check and a comparison check of the outputs (104, 204) of the chip A and chip B logics, while the comparators (134, 136) on master module (100) are involved only in a self-checking function.

Since the driver (106) on chip A is enabled, the output (104) of CHIP A logic (102) passes through the driver (106) to the inputs of the NORs (234, 236) and thence to the check logic (242) on checker module (200), while the output (204) of the CHIP B logic (202) is prevented from passing through the driver (206) to the inputs of the NORs (134, 136) and thence to the check logic (142) on master module (100).

The outputs (104, 204) of the chip logics on each module are checked by means of the FRC logic on the module (200) designated as a checker by comparing the outputs of CHIP A logic with the outputs of CHIP B logic at the exclusive ORs (234, 236). A non-matching condition will cause the ERROR DETECT BIT 1 and/or ERROR DETECT BIT 2 line to be asserted.

The exclusive ORs (129, 131) on module (100) connected to the shift chain (122, 124) present the injected error bit generated by the shift chain (122, 124) to the inputs (130, 132) of the FRC logic comparators (134, 136). Similarly, the exclusive ORs (229, 231) on module (200) connected to the shift chain (214, 216) present the injected error bit generated by the shift chain (214, 216) to the inputs (230, 231) of the FRC logic comparators (234, 236). An error in the functioning of the FRC logic is detected by the check logic (FIG. 3) which is connected to the control logic and to the FRC logic comparators on each module. The logic circuit (80, 82, 84) of FIG. 3 will generate an error signal output (86) upon the conditions set forth in the truth logic shown in FIG. 4.

The self-checking circuitry expands on the basic FRC checking function in U.S. Pat. No. 4,176,258 of Daniel Jackson by adding self-checking circuits duplicated on each chip which inject faulty data into the FRC checking logic to prove that the FRC error logic can detect the injected error. The shift register (122, 124) acts as a faulty data generator. The exclusive NORs (129, 131) act as a faulty data injector into the FRC logic (134, 136). The logic of FIG. 3 acts as an expected-error vs actual-error value comparator.

The advantage of this logic over the previous FRC logic is that any failure in the FRC logic itself will be automatically detected and reported. If the self-checking logic were split over two modules, there would have to be external logic that would need additional interfaces and its own self-checking circuits.

The shift register (122, 124) is used to inject a single erroneous bit into the FRC circuit. There is only a single bit asserted in the shift register at any one time. This single error bit is anticipated by the control logic (110) using the flip-flop (56) shown in FIG. 2.

Referring now to FIG. 2, the F signal output from the frequency divider is combined with BOUT (14) in AND (54). When BOUT (14) is asserted the circuit is activated. The flip-flop (56) is driven by the output (55) of the AND (54) so that it is synchronized with the shift chain that injects the error bit.

The error is injected by asserting a local error inject signal (126, 128) through exclusive NORs (129, 131). At the same time the output of the flip-flop (56) expects that a local error bit is being injected and the TEST BIT output of the flip-flop is used to verify that fact. At the time that the local inject (126) is asserted, then the signal (114) expecting that error because of the self-check is also asserted. The check logic block (134) then expects an error to occur on one error line (138) and expects the other error line (140) to show no error. Any other combination should signal an FRC self-check error.

In a circuit where more than one bit is being FRCd, the shift register has a pattern of all logic "0s" and a single logic "1." The bit with the logic "1" is the bit with the injected error.

A relatively frequent signal (F) must be used to control the shifting of the error bit that is injected by the shift chains on each module. Any frequency occurring signal could be used, for example the clock (CLK) signal could be divided by four, causing the shift chain to shift on every fourth CLK cycle.

The master and checker both inject errors into their own FRC logic circuits independently of each other. Although they could, there is no requirement that they inject related errors, like the checker injecting the opposite error as the master. The only time that the BERL line (24) is pulled is when either the master or the checker actually detect an error that needs to be reported to external circuitry.

While the invention has been particularly shown and described with reference to a preferred embodiment thereof, it will be understood by those skilled in the art that various changes in form and detail may be made therein without departing from the scope of the invention.

We claim:

1. In an integrated circuit module (200) in which an error detection circuit (236) compares data (204) generated internally on said module (200) with data (108) generated externally from another substantially identical module (100) to thereby assert an error detect output (240) upon the condition that said data (204) generated internally on said module (200) and said data (108) generated externally from said other module (100) do not match, the improvement comprising:

means (220) for altering said internally generated data (204) by injecting erroneous data into said internally generated data (204) to thereby generate altered data (232);

said means (220) for altering said internally generated data (204) including first means (224) for digitally storing data, said data being shifted upon application of a clock pulse, said first means being driven by a clock pulse source (201), said second means (231) for combining the output (228) of said first means (224) and said data (204);

error anticipation means (210) for generating a test condition (216), which test condition corresponds to an expected error condition caused by said altered data (232) at the error detect output (240) of said error detection circuit (236);

said error anticipation means (210) being a circuit (56) with two stable states that can be changed from one state to the other, said circuit being driven alternately between said one state and said other state by said clock pulse source (201); and, comparison means (242) for comparing said actual error detect output (240) with said expected error detect output (216).

2. The combination in accordance with claim 1 wherein said first means (224) is a shiftchain and said second means (231) is an exclusive OR; and, said circuit (56) with two stable states is a flip-flop.

3. The combination in accordance with claim 2 wherein said comparison means (242) includes means (80, 84) for generating an error output (86) upon the condition that said actual error detect output (240) and said expected error detect output (216) do not match.

4. The combination in accordance with claim 1 wherein said comparison means (242) includes means (80, 84) for generating an error output (86) upon the condition that said actual error detect output (240) and said expected error detect output (216) do not match.

* * * * *